United States Patent [19]
Hasegawa

[11] Patent Number: 5,353,130
[45] Date of Patent: Oct. 4, 1994

[54] COLOR IMAGE PROCESSING APPARATUS

[75] Inventor: Akiko Hasegawa, Kawasaki, Japan

[73] Assignee: Canon Kabushiki Kaisha, Tokyo, Japan

[21] Appl. No.: 813,499

[22] Filed: Dec. 26, 1991

[30] Foreign Application Priority Data

Dec. 28, 1990 [JP] Japan ................... 2-408921

[51] Int. Cl.$^5$ ........................ H04N 1/46; H04N 1/40
[52] U.S. Cl. ..................... 358/530; 358/501; 358/449
[58] Field of Search ............ 358/75, 78, 400, 401, 358/448, 449, 464, 500, 501, 505, 515, 518, 520, 523, 524, 530

[56] References Cited
U.S. PATENT DOCUMENTS 4,975,768 12/1990 Takaragi ................... 358/75
5,032,904 7/1991 Murai et al. ............... 358/75
5,198,853 3/1993 Ichihara et al. ............ 358/449

Primary Examiner—Edward L. Coles, Sr.
Assistant Examiner—Thomas D. Lee
Attorney, Agent, or Firm—Fitzpatrick, Cella, Harper & Scinto

[57] ABSTRACT

An original area of a color original placed on an original base is accurately detected. Color component signals of R, G and B generated by a line sensor 1-1 are converted into a lightness component L* and a chromatic component C*. Latch circuits 1-12 through 1-15 use these two components to detect the original area of the color original present on the original base.

35 Claims, 12 Drawing Sheets

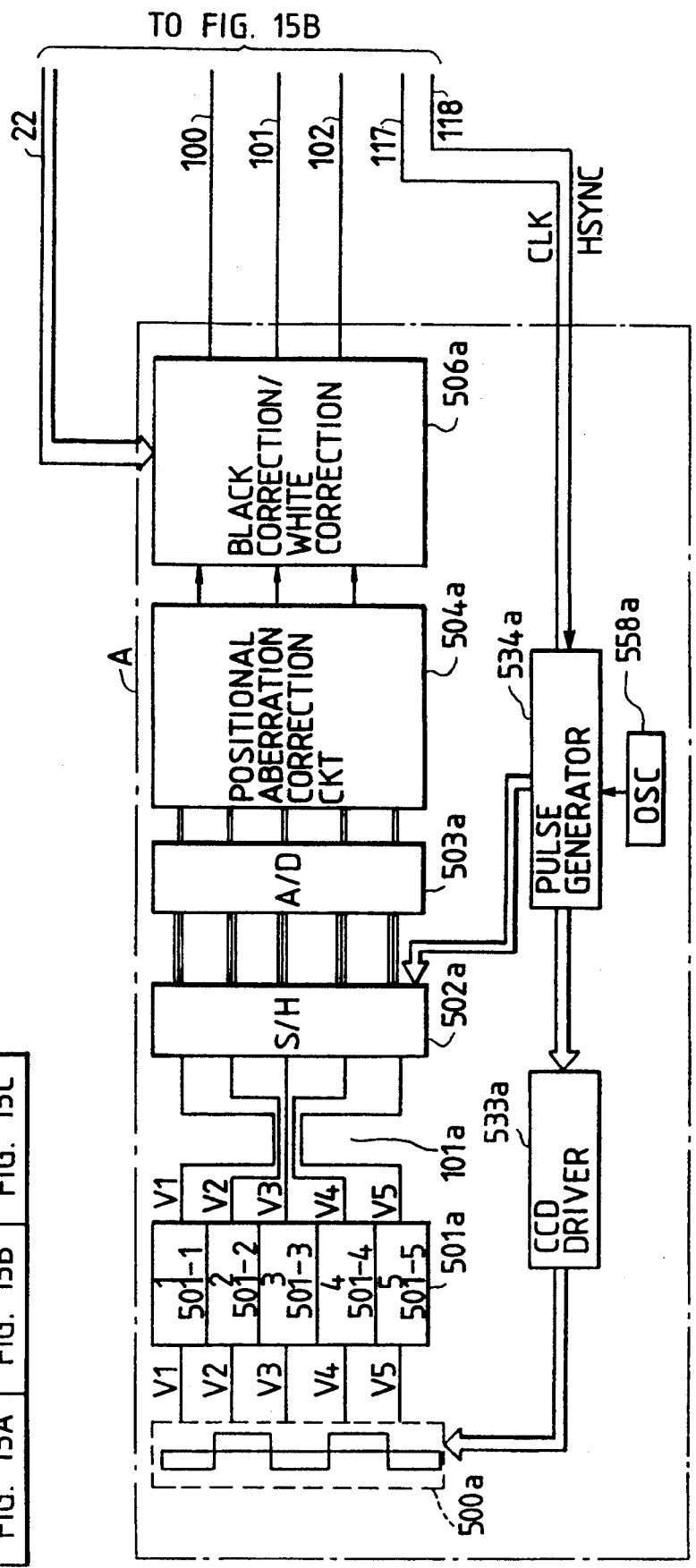

FIG. 15B ly. In FIG. 2, reference symbols S and M respectively
COLOR IMAGE PROCESSING APPARATUS

BACKGROUND OF THE INVENTION

1. Field of the Invention

The present invention relates to a color image processing apparatus having a function of detecting the position and size of an original, and more particularly, to the structure of detecting the position and size of an original by detecting a contrast between a portion where the original is present and a portion where the original is absent in, for example, a digital color copying machine.

2. Related Background Art

Original reading apparatuses for detecting the position and size of an original present on an original base are disclosed in, for example, U.S. Pat. No. 5,001,574.

In the technique disclosed in U.S. Pat. No. 5,001,574, image data is obtained by a line sensor which serves as image reading means and which employs a CCD for converting an original into an electric signal. Also, discrimination between an original area and a non-original area is made by obtaining a signal corresponding to black from the non-original area and by detecting a white base of the original. Furthermore, a counter for counting the number of output bits in a main scan direction of the line sensor and a counter for counting the number of lines in a sub scan direction are operated synchronously with a reference position of the original base. The position of the original base where the original is present is detected by detecting the white signal of the original area and by holding the counted values in the main and sub scan directions.

FIG. 2 explains how an original is read conventionally. In FIG. 2, reference symbols S and M respectively denote an original base and an original placed on the original base S. 'x' indicates the main scan direction of the line sensor. 'y' shows the sub scan direction thereof. SP is reference position with respect to the main scan direction x. The position and size of the original M placed on the original base S can be recognized by detecting a white signal of point P1 on the original M which is to be detected first, a white signal of point P2 closest to the reference position SP with respect to the main scan direction x, a white signal of point P3 farthest from the reference position SP with respect to the main scan direction x, and a white signal of point P4 which is to be detected last.

Conventional original reading techniques are also disclosed in U.S. Pat. Nos. 4,439,790, 4,811,047 and 4,686,577 and U.S. patent application Ser. No. 575,878.

However, in the aforementioned original reading techniques, since discrimination between the original area and the non-original area is made utilizing only a difference in the lightness of both areas, if the original has at its end portion a portion having a relatively low lightness, for example, a red portion, the original area may not be detected correctly, resulting in erroneous determination.

Such a problem occurs regardless of the material or color of an original cover for pressing the original.

Particularly, in the case of a full-color copying machine in which color originals are copied, the aforementioned problem is serious.

The same problem occurs in a color reader or the like.

SUMMARY OF THE INVENTION

In view of the aforementioned problem of the conventional technique, an object of the present invention is to provide a color image processing apparatus for accurately detecting an original area of a color original.

Another object of the present invention is to provide a color image processing apparatus for detecting an original area by using a chrominance signal.

Still another object of the present invention is to provide a color image processing apparatus for detecting an original area by effectively utilizing a plurality of color component signals.

Still another object of the present invention is to provide an image processing apparatus which is capable of performing various types of image processings on the basis of the results of the detection of the original area.

Still another object of the present invention is to provide a color image processing apparatus which enables simplification of a circuit configuration.

Still another object of the present invention is to provide a color image processing apparatus which allows for high-speed image reproduction.

Still another object of the present invention is to provide a color image processing apparatus which enables operability to be enhanced.

Other objects and aspects of the present invention will become apparent from the following description of embodiments with reference to the accompanying drawings.

DETAILED DESCRIPTION OF THE PREFERRED EMBODIMENTS

In the present invention, in addition to conventional means for determining the presence of the original utilizing lightness, means for determining presence of an original utilizing saturation or hue is provided. An original presence signal is produced by implementing the logical OR operation on these two determinations. Consequently, presence of a color original having a low lightness can readily be detected.

A first embodiment of the present invention will be described below with reference to the accompanying drawings.

FIRST EMBODIMENT

Figure 1:
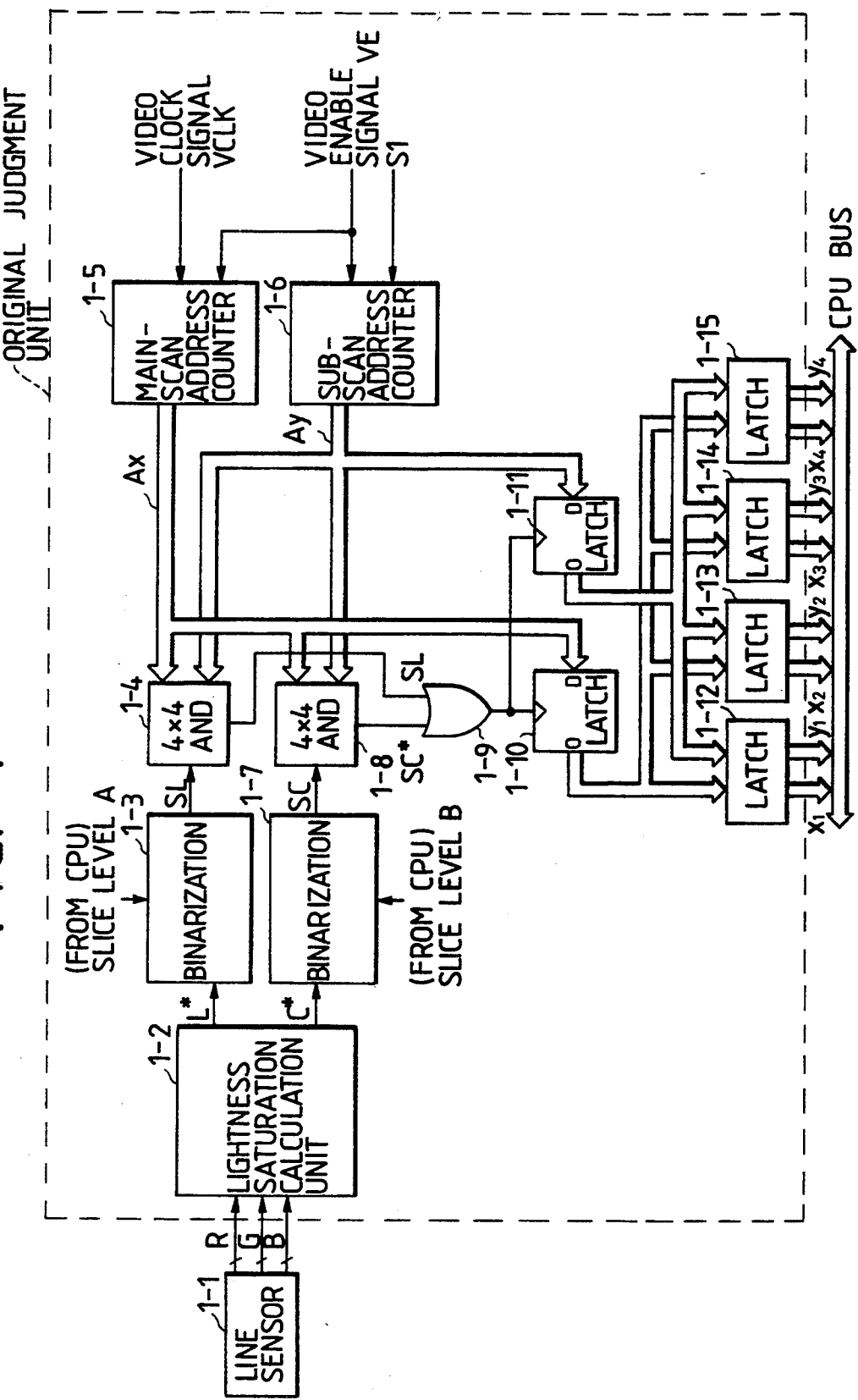
FIG. 1 is a diagrammatic view illustrating the structure of a first embodiment of the present invention.
Figure 2:
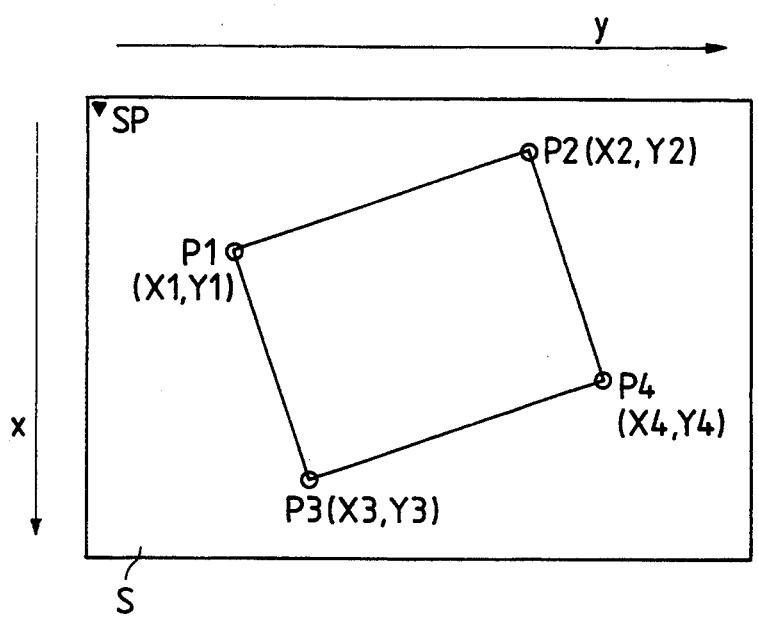
FIG. 2 illustrates a conventional original reading method.

Configuration (FIGS. 1 and 2)

FIG. 1 shows the configuration of a first embodiment of a color original reading device according to the present invention.

Image signals R (red), G (green) and B (blue) read in by scanning an original present on an original base by means of a line sensor 1-1, such as a CCD, are input into a lightness/saturation calculation unit 1-2 which converts them into a lightness signal L* and a saturation signal C*, respectively. The lightness signal L* is binarized using a preset slice level A to produce a "white" signal SL, while the saturation signal C* is binarized using a preset slice level B to produce a "color" signal SC.

Circuits 1-4 and 1-8 implement the logical AND operation on the signals representing four pixels in the main scan direction and four lines in the sub scan direction and thereby determine that an entire area of 4×4 pixels is "white" or "colored".

A main scan address counter 1-5, when initialized by a video enable signal VE, counts a video clock signal VCLK, and produces an address signal Ax corresponding to an address on the original base in the main scan direction X.

A sub scan address counter 1-6, when initialized by a signal S1 indicating input of a video signal from the original base reference position SP, counts the video enable signal VE starting from SP, and produces an address signal Ay corresponding to an address on the original base in the sub scan direction Y.

An OR circuit 1-9 implements the logical OR operation on the "white area" signal SL* output from the logical AND circuit 1-4 and the "colored area" signal SC* output from the logical AND circuit 1-8, and produces a signal indicating presence of the original. The main scan address signal Ax and the sub scan address signal Ay, indicating the original presence position, are respectively retained in latch circuits 1-10 and 1-11 by the signals SL* and SC*.

Latch circuits 1-12 to 1-15 constitute a coordinate determination unit. The latch circuit 1-12 retains an address corresponding to the position of an original signal detected first during scanning of the original base, i.e., an address corresponding to point P1 (x1, y1) in FIG. 2. The latch circuit 1-13 retains an address corresponding to the original signal closest to the original base reference position SP in the main scan direction x, i.e., an address corresponding to point P2 (x2, y2) in FIG. 2. The latch circuit 1-14 retains an address corresponding to the original signal of the position farthest from the original base reference position SP in the main scanning direction x, i.e., an address corresponding to point P3 (x3, y3) in FIG. 2. The latch circuit 1-15 retains an address corresponding to the original signal obtained last during scanning of the original, i.e., an address corresponding to point P4 (x4, y4) in FIG. 2.

Figure 3:
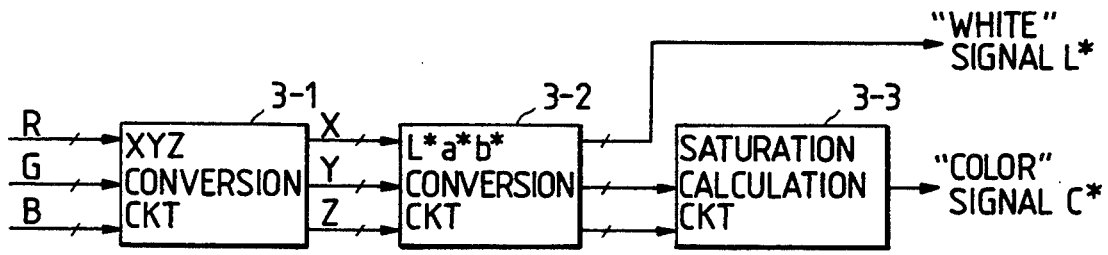
FIG. 3 is a block diagram of a lightness/saturation calculation unit.
Figure 4:
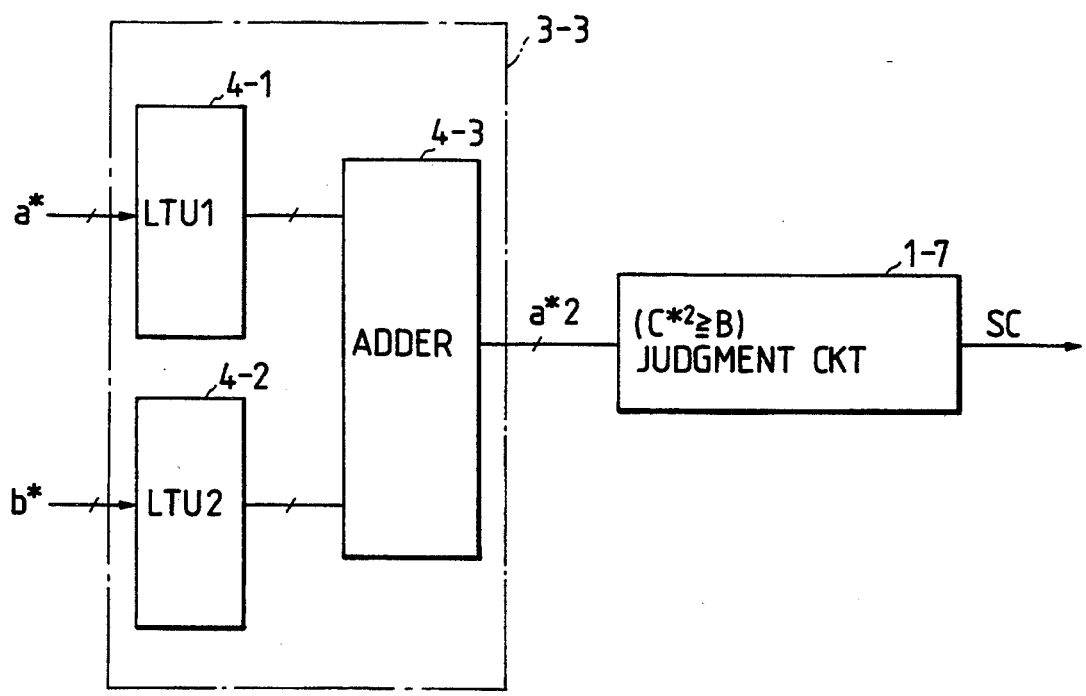
FIG. 4 is a circuit diagram of a chromatic color detection circuit of the first embodiment.
Figure 5:
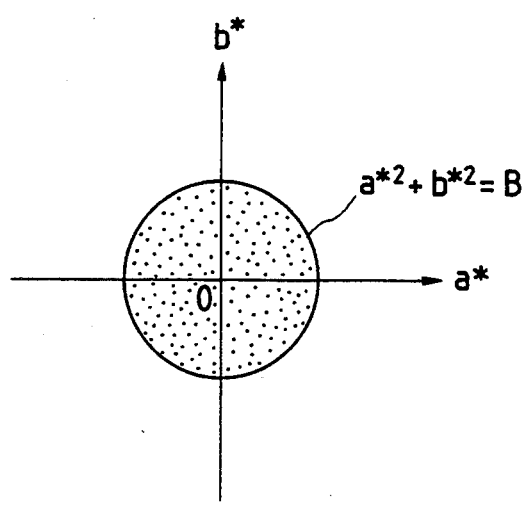
FIG. 5 illustrates an area of a chromatic color as viewed on an a*b* plane.

Lightness/Saturation Calculation Unit (FIGS. 3 Through 5)

FIG. 3 shows a detailed configuration of the lightness and saturation calculation unit 1-2. A XYZ conversion circuit 3-1 converts R, G, B digital signals into signals X, Y, Z expressed by the XYZ system using product-/sum operation (1) of 3×3.

$$\begin{pmatrix} X \\ Y \\ Z \end{pmatrix} = \begin{pmatrix} 0.4900 & 0.3100 & 0.2000 \\ 0.1770 & 0.8124 & 0.0106 \\ 0.0000 & 0.0100 & 0.9900 \end{pmatrix} \begin{pmatrix} R \\ G \\ B \end{pmatrix} \quad (1)$$

A L*a*b* conversion circuit 3-2 converts the XYX system signals X, Y, X output from the XYZ conversion circuit 3-1 into a lightness signal L* and hue signals a*, b* by an operation (2).

$$L^* = 116 \, (Y/Y_0)^{\frac{1}{3}} - 16 \quad (Y > 0.008856)$$

$$L^* = 903.29 \, (Y/Y_0) \quad (Y \leq 0.008856)$$

$$a^* = 500 \, \{(X/X_0)^{\frac{1}{3}} - (Y/Y_0)^{\frac{1}{3}}\}$$

$$b^* = 200 \, \{(X/X_0)^{\frac{1}{3}} - (Z/Z_0)^{\frac{1}{3}}\} \quad (2)$$

The lightness signal L* is used as the "white" signal without change, while the hue signals a*, b* are input to a chromatic color determination circuit 3-3.

FIG. 4 is a diagrammatic view of the chromatic color determination circuit 3-3. FIG. 5 shows an area of a chromatic color as viewed on an a*b* plane which is used as a determination reference area in the first embodiment. On the a*b* plane made up of a* axis and b* axis, the portion close to an origin 0 (white) is regarded as an achromatic color. Since $C^{*2} = a^{*2} + b^{*2}$ increases as the saturation increases, it can be determined whether $C^{*2}$ is a chromatic or achromatic color by comparing it with the slice level B which is a limit of the achromatic color $$Sc = 1 \text{ (chromatic color): } C^{*2} \geq B$$

$$Sc = 0 \text{ (achromatic color): } C^{*2} < B \quad (3)$$

In FIG. 4, loop-up tables (LUT) 4-1 and 4-2 are respectively used to implement the aforementioned $a^{*2}$ and $b^{*2}$ operations. An adder 4-3 adds $a^{*2}$ and $b^{*2}$ output from the look-up tables 4-1 and 4-2 to produce a saturation signal $C^{*2}$. The saturation signal $C^{*2}$ is input to the binarization circuit 1-7 shown in FIG. 1.

Figure 6:
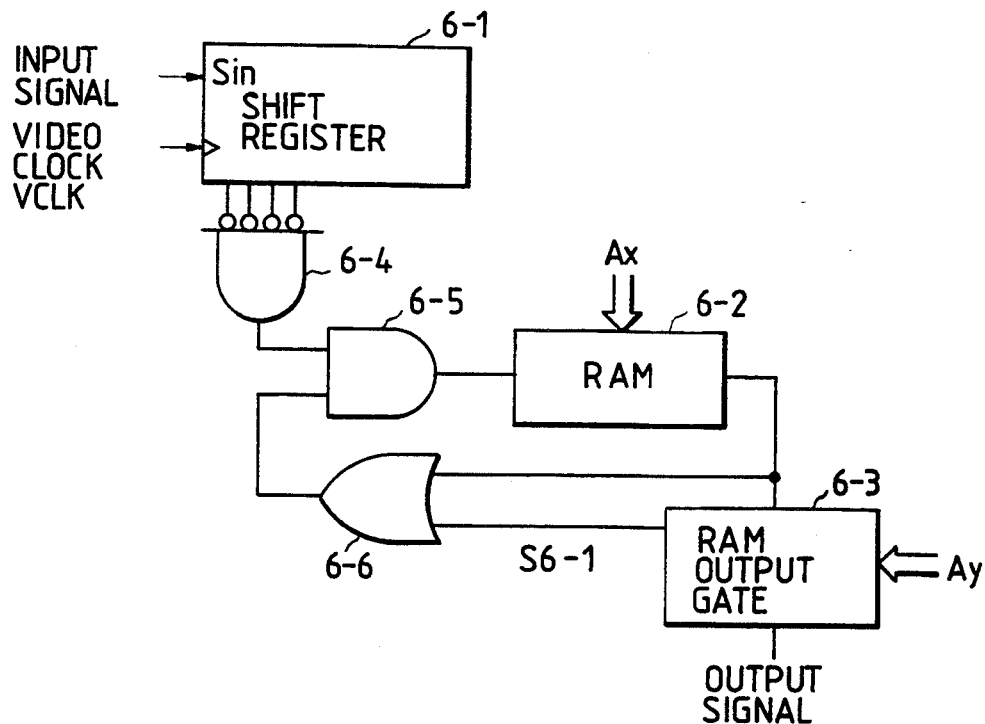
FIG. 6 is a circuit diagram of a logical AND circuit of 4 pixels×4 lines.

Area AND circuit (FIG. 6)

FIG. 6 is a diagrammatic view of a circuit for implementing the logical AND operation on signals of 4 pixels×4 lines in FIG. 1.

A shift register 6-1 detects pixel signals continuing in the main scan direction x. In this embodiment, the shift register 6-1 detects the white pixel signals continuing in 4 bits.

A RAM 6-2 stores pixel signals continuing in one line which are supplied from the shift register 6-1 to a terminal $D_{in}$.

A gate circuit 6-3 receives the signal stored in the RAM 6-2 from a terminal $D_{out}$, and sends out an address latch signal to a position detection circuit. The shift register 6-1 and a gate 6-4 connected to the shift register 6-1 in combination implement the logical AND operation on the video signals continuing in 4 bits. Thereafter, the results of the operation are written in the RAM 6-2 in accordance with the address signal Ax which changes every 4 clocks of the video clock signal VCLK, by which presence or absence of the original can be determined in every 4 bits in the main scan direction. The data representing presence or absence of the original and continuing 1 line in the main scan direction x, stored in the RAM 6-2, is read out when data on a subsequent line is written. A gate 6-5 implements the logical AND operation on these data, and writes the results of the operation in the RAM 6-2 again. By repeating the aforementioned processings, the data representing presence or absence of the original and continuing over a plurality of lines is stored in the RAM 6-2.

The gate circuit 6-3 also outputs a signal S6-1 in every 4 lines. The output of an OR gate 6-6 rises by this signal, and a AND gate 6-5 thus outputs the output of the gate 6-4 to the RAM 6-2 without change. That is, the data on which no logical AND operation is implemented is written in the RAM 6-2 in every 4 lines to initialize the RAM 6-2 and thereby allow the original signals continuing in 4 lines in the sub scan direction y to be read until the signal S6-1 is output again.

Once the signal S6-1 is output, the RAM output gate 6-2 outputs the data representing presence or absence of the original and stored in the RAM 6-2 by that time, and the original positions Ax and Ay are thus respectively latched in the latch circuits 1-10 and 1-11. As mentioned above, in this embodiment, the signals B, G, R from the line sensor are dispersed into the lightness signal L* and the saturation signal C*, and "white area" or "colored area" is detected in every area of 4 lines×4 pixels to detect the original.

In this embodiment, L*a*b* system is used. Alternatively, lightness and saturation can also be calculated using YIQ, Yuv, L*u*v* or YCrCb system.

Figure 14:
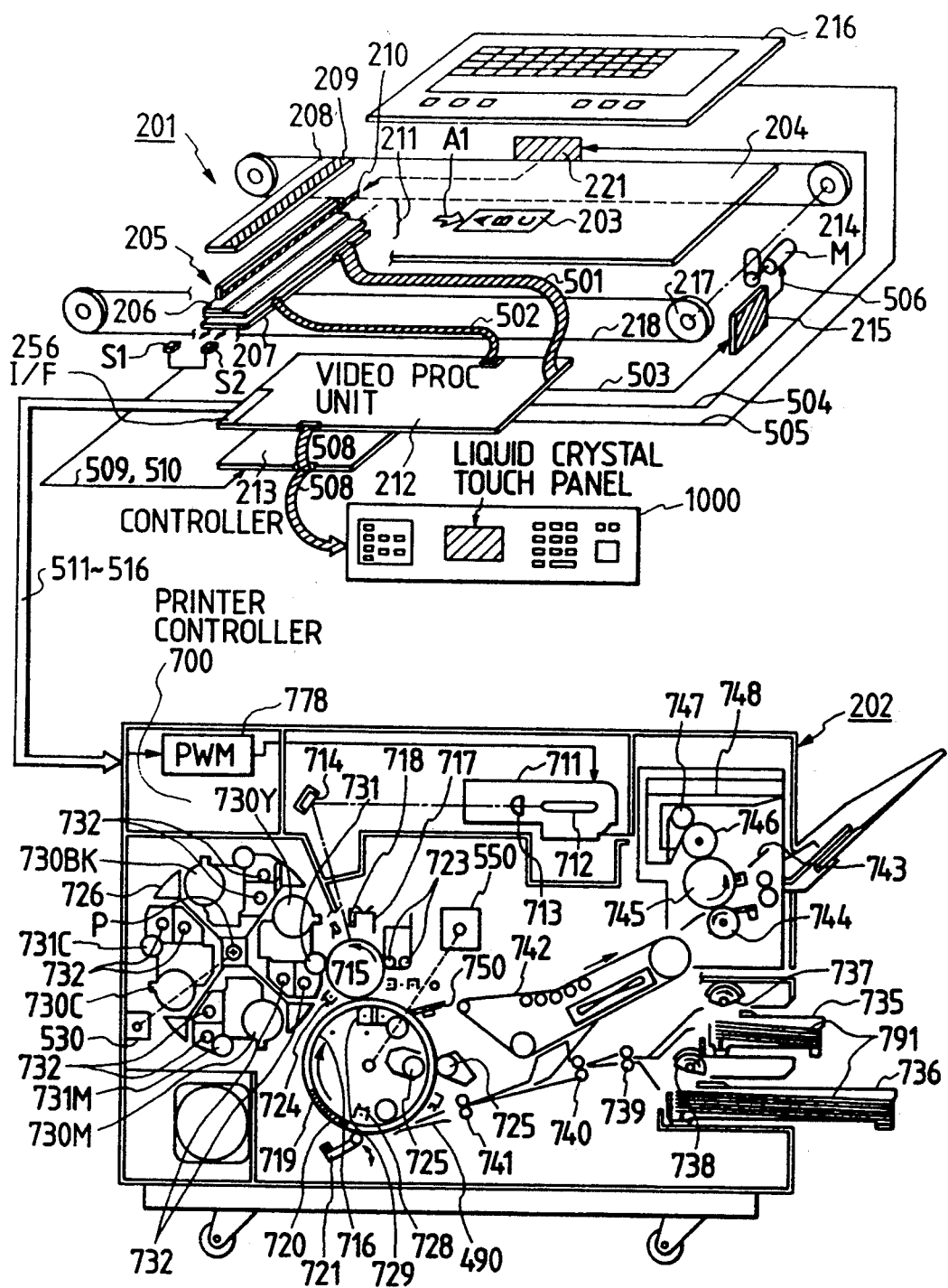
FIG. 14 is a schematic view of a digital color image processing system having an original judgement unit (FIG. 1) according to the present invention.

FIG. 14 schematically shows a digital color image processing system having an original judgement unit (FIG. 1) according to the present invention. As shown in FIG. 14, this color image processing system includes a digital color image reading device (hereinafter referred to as a color reader) 201 disposed in the upper portion of the system, and a digital color image printing device (hereinafter referred to as a color printer) 202 disposed in the lower portion of the system. The color reader 201 reads color image data of an original separately in colors and electrically converts the color image data into a digital image signal by means of color decomposition means and a photoelectric conversion element, such as a CCD, which will be explained later. The color printer 202 is an electrophotographic type laser beam color printer for reproducing color images separately in colors in response to that digital image signal, and digitally records them on a sheet of recording paper in the form of dots by performing transfer a plurality of times.

The color reader 201 will be outlined first.

An original 203 is placed on a platen glass 204. A light obtained by scanning of a halogen exposure lamp 210 is reflected by the original, and the reflected light is directed to a life size full color sensor 206 by a rod array lens 205. An original scanning unit 211, made up of the rod array sensor, the full color sensor 206, a sensor output signal amplifying circuit 207 and the halogen exposure lamp 210, performs exposure scanning in a direction indicated by an arrow A1. A color decomposed image signal, which is read in each line through the exposure scanning operation of the original scanning unit 211, is amplified to a predetermined voltage by a sensor output signal amplifying circuit 207. The amplified signal is input to a video processing unit, which will be explained in detail later, via a signal line 501 and is processed. This signal processing will be described in detail later. The signal cable 501 is a coaxial cable which is capable of faithful transmission of the signal. A driving signal for the life size full-color sensor 206 is generated by a video processing unit 212 and is supplied to the sensor 206 via a signal line 502. A white plate 208 and a black plate 209 are respectively irradiated by the halogen exposure lamp 210 to obtain signal levels representing predetermined densities which are used for white and black level correction of a video signal, which will be described in detail later. A control unit 213 having a microcomputer controls the entire color reading unit 201. That is, the control unit 213 controls display and key input on an operation panel 1000 as well as the video processing unit 212 via a bus 508. It also controls detection of the position of the original scanning unit 211 by means of position sensors S1 and S1 via signal lines 509 and 510. The control unit 213 also controls a stepping motor driving circuit 215 for pulse driving a stepping motor 214 via a signal line 503 to move the scanning unit 211, an exposure lamp driver via a signal line 504 to control ON/OFF of and intensity of light emitted from the halogen exposure lamp 210, a digitizer 216 via a signal line 505, and inner keys and display portions. A color image signal read by the exposure scanning unit 211 during exposure scanning of the original passes through the amplifying circuit 207 and is then input to the video processing unit 212 which performs various types of processings on the image signal, which will be described later, via the signal line 501. The processed signal is sent out to the printer unit 202 through an interface circuit 256.

Next, the color printer 202 will be outlined. A scanner 711 includes a laser output portion for converting the image signal from the color reader 201 into a light signal, a polygonal mirror 712 (which may be an octahedron), a motor (not shown) for rotating the polygonal mirror 712, a f/θ lens (an image forming lens) 713 and so on. A reflection mirror 714 changes the optical path of a laser beam and thereby directs the laser beam to a light-sensitive drum 715. The laser beam emitted from the laser output portion is reflected by the polygonal mirror 712, passes through the lens 713 and then the mirror 714 and scans in lines (raster scans) the surface of the light-sensitive drum 614 to form a latent image corresponding to the original image on the drum 715.

A primary charger 717, an entire surface exposure lamp 718, a cleaner 723 for removing toner remaining on the drum 715, a pre-transfer charger 724 are disposed around the light-sensitive drum 615.

A developer unit 726 for developing the latent image formed on the surface of the light-sensitive drum 715 by laser exposure includes developing sleeves 731Y, 731M, 731C and 731Bk which are brought into contact with the light-sensitive drum 715 to perform developing of the latent image, toner hoppers 730Y, 730M, 730C and 730Bk for holding preliminary toners, screws 732 for conveying the developer. The developing sleeves, toner hoppers and screws are all disposed around a rotary axis P of the developer unit. When a toner image of, for example, yellow is to be formed, yellow toner development is performed at the position illustrated in FIG. 14.

To form a toner image of magenta next, the developer unit 726 is rotated about the axis P so that the developing sleeve 731M of the magenta developer moves to a position where it can make contact with the light-sensitive drum 715. Development of cyan and black is performed similarly.

A transfer drum 716 transfers the toner image formed on the light-sensitive drum 715 onto a sheet of paper. An actuator plate 719 for detecting the position of the transfer drum 716, a position sensor 720 disposed close to the actuator plate 719 so that it can detect movement of the transfer drum 716 to its home position, a transfer drum cleaner 725, a paper press roller 727, a changer remover 728 and a transfer charger 729 are disposed around the transfer drum 716.

Paper feed cassettes 735 and 736 accommodate paper (sheets of paper). Paper feed rollers 737 and 738 respectively feed out the paper from the cassettes 735 and 736. Conveyance of the paper is timed by paper feed rollers 739, 740 and 741. The sheet of paper which is conveyed by the rollers 739, 740 and 741 is guided by a paper guide 749 and is wound around the transfer drum 716 in a state wherein a forward end thereof is carried by a gripper which will be described later. Transition of the sheet of paper to an image forming process is thus performed.

A drum rotating motor 550 rotates the light-sensitive drum 715 and the transfer drum 716 synchronously with each other. A sheet of paper which has passed through the image forming process is removed from the transfer drum 716 by a peeling claw, and the removed sheet of paper is conveyed to an image fixing unit which fixes the image onto the paper via a convey belt 742. The image fixing unit 743 has a pair of heat pressure rollers 744 and 745.

An image processing circuit according to the present embodiment will now be described with reference to FIG. 15. This image processing circuit is applied to a color image copier machine in which an original of full colors is exposed to an illumination source, such as a halogen lamp or a fluorescent lamp, a color reflected image is imaged by a color image sensor (CCD), an obtained analog image signal is digitized by an A/D converter, the digital full color image signal is processed, and the processed image signal is output to a heat transfer color printer, an ink jet color printer or a laser beam color printer to obtain a color image. The image processing circuit can also be applied to a color image output device for processing a digital color image signal received from a computer, other color image reading device or a color image transmission device, and outputs the processed color image signal to the color printer.

Figure 15B:
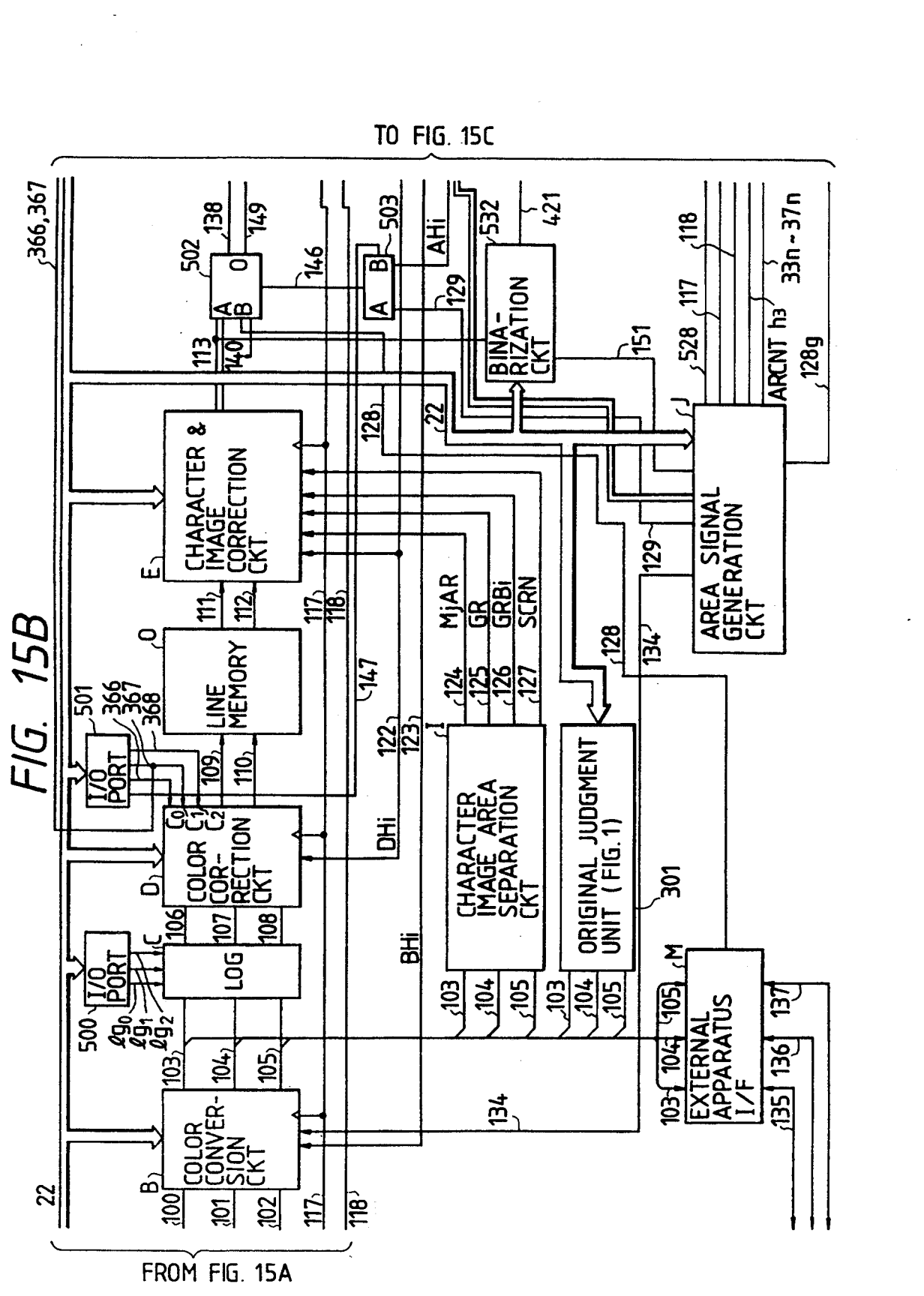
Figure 15C:
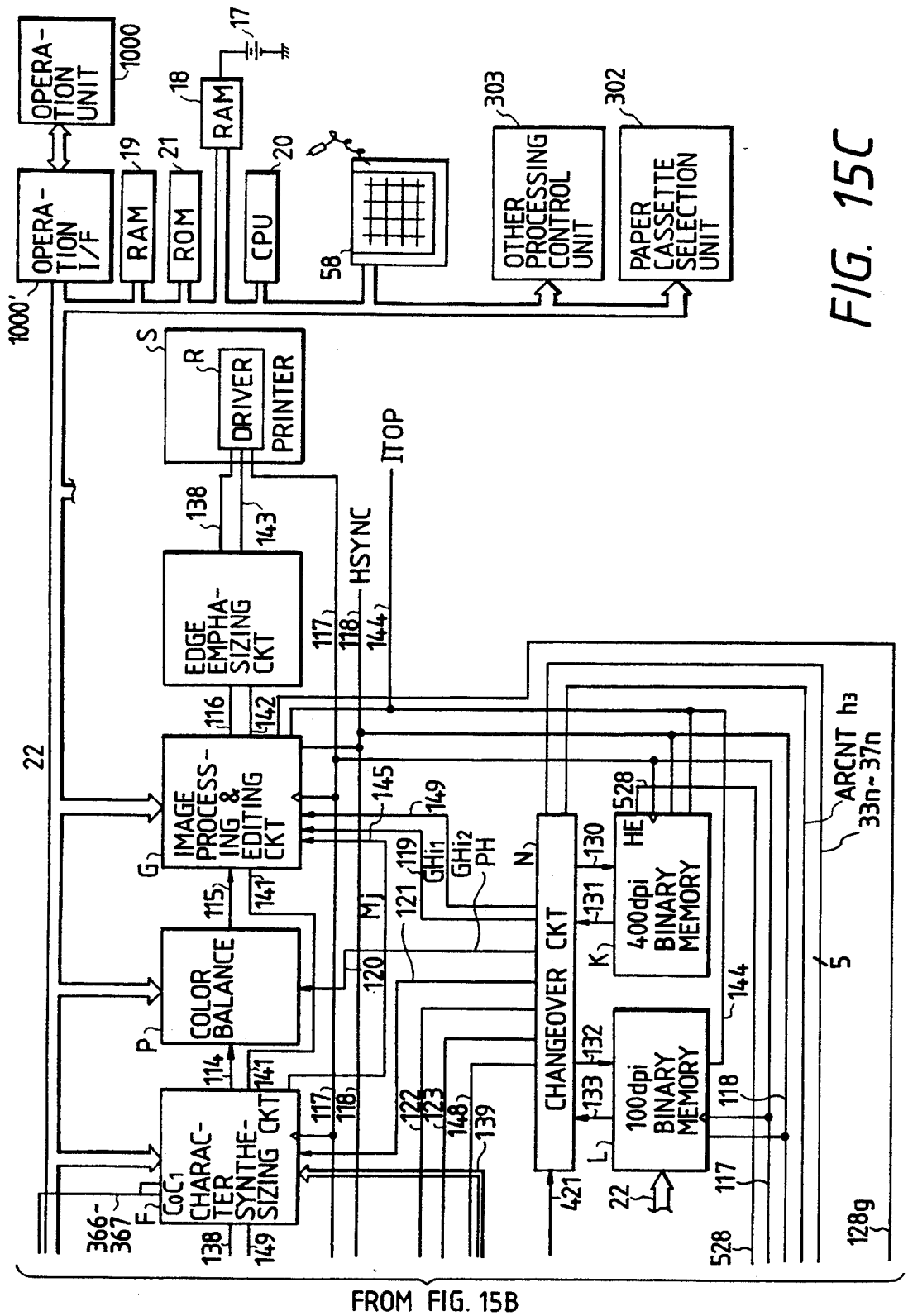
FIG. 15 is a block diagram of an image processing circuit in the first embodiment of the present invention.

In FIG. 15, an image reader A includes a staggered arranged CCD line sensor 500a, a shift register 501a, a sample-hold circuit 502a, an A/D converter 503a, a positional aberration correction circuit 504a, a black correction/white correction circuit 506a, a CCD driver 533a, a panel generator 534a and an oscillator 558a.

In FIG. 15, reference symbol B denotes a color conversion circuit; C, a LOG conversion circuit; D, a color correction circuit; O, a line memory; E, a character image correction circuit; F, a character synchronizing circuit; P, a color balance circuit; G, an image processing & editing circuit; H, an edge emphasizing circuit; I, a character image area separation circuit; J, an area signal generation circuit; K, a binary memory of 400 dpi; L, a binary memory of 100 dpi; M, an external apparatus interface; N, a signal change-over circuit; reference number 532 denotes a binarization circuit; and R, a driver for driving a printer, which may be a laser driver for a laser beam printer or a bubble jet head driver for a bubble jet printer.

Reference numeral 58 denotes a digitizer; 1000, an operation unit; 1000', an operation interface; 18, 19, RAMs; 20, a central processing unit; 21, a ROM; 22, a central processing unit bus; and 500 and 510, input/output ports.

Reference numeral 301 denotes an original judgement unit shown in FIG. 1 to which image signals R, G, B 103 through 105 are input from the color conversion circuit B. The data from the latch circuits 1-12 through 1-15 are sent to the CPU bus 22 as the results of the judgement. The CPU 20 performs control which will be explained later using the results of the judgement.

A paper cassette selection unit 302 performs paper size selection in response to the aforementioned detection of the size of the original by making a selection between the cassette 735 in which sheets of paper of A4 are accommodated and the cassette 736 where sheets of paper of A3 are accommodated.

An other processing control unit 303 controls display means for displaying, for example, the selected paper size, or other processings.

Using the detected size of the original, the image processing & editing circuit G may perform the known processings, such as auto-zooming in which automatic reduction is performed when the size of the original is larger than the size of the prepared paper, center shift in which the position at which the original is reproduced is shifted to the center of the paper, or original edge erasing in which the edge of the original is erased.

SECOND EMBODIMENT

In the first embodiment, the portion where the original is absent, i.e., the portion of the original cover, is read by the line sensor as "black", i.e., "$S_Y=0$ and "achromatic color:, i.e., $S_C=0$. In that case, whereas an original of a color having a low lightness and a high saturation, e.g., of red, can be readily detected, detection of the original of a color having low saturation and lightness, e.g., of reddish-brown, depends on the aforementioned slice levels A and B.

Hence, the second embodiment is directed to detection of an original having low saturation and lightness which is achieved by using an original cover in a color of "white", i.e., of $S_L=1$ and "chromatic color", i.e., of $S_C=1$, e.g., of yellow.

Figure 7A:
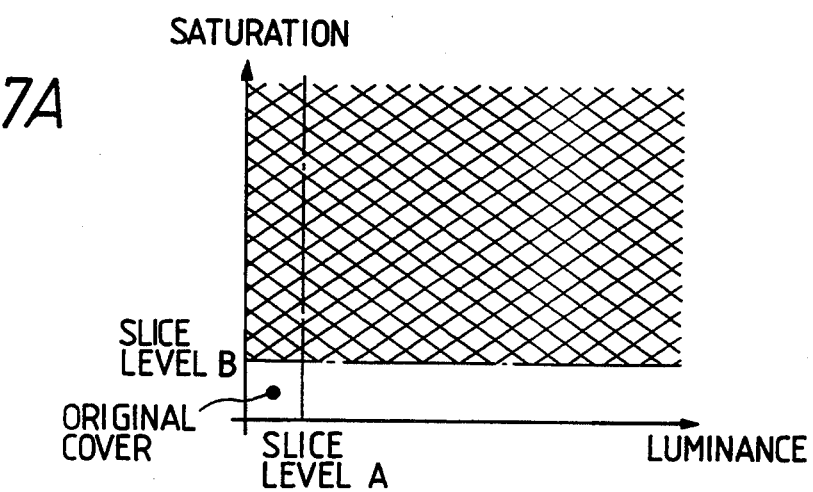
FIGS. 7A and 7B respectively illustrate a slice level used in the first and second embodiments.
Figure 7B:
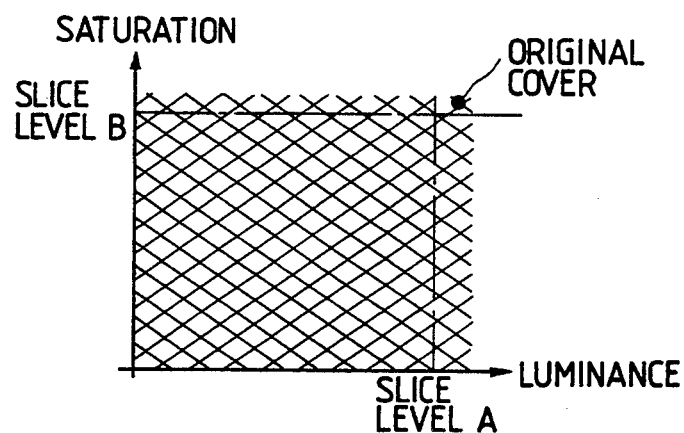
Figure 8:
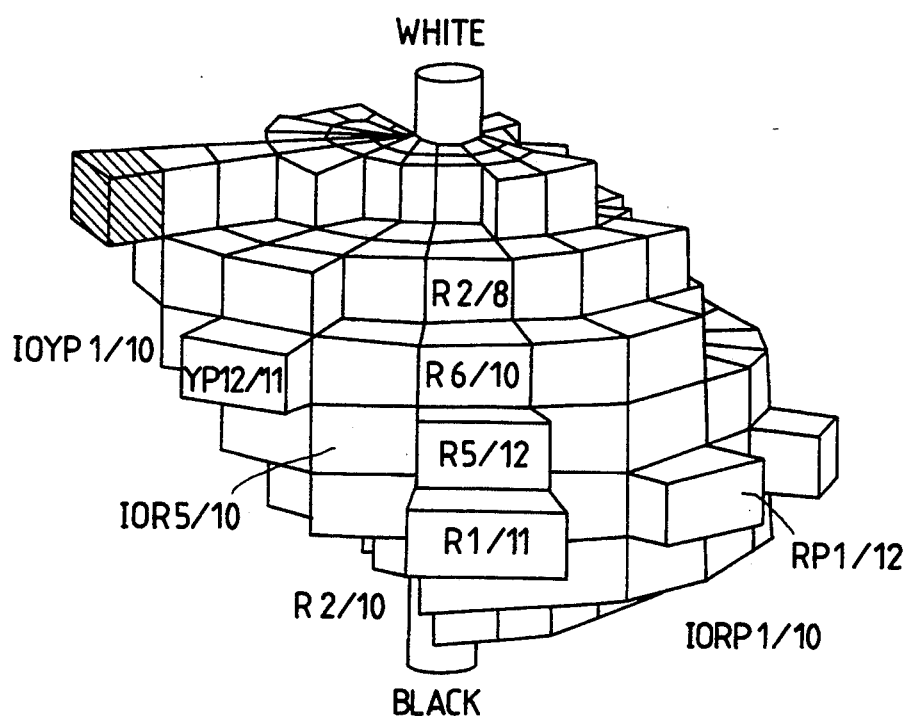
FIG. 8 shows a Mansell color cube.

FIGS. 7A and 7B schematically show the second embodiment in comparison with the first embodiment. FIG. 8 shows Munsell color cube.

Whereas in the first embodiment, it is determined that the original is present when the lightness SL is higher than the slice level A (SL=1) or when the saturation SC is higher than the slice level B (indicated by a hatched portion in FIG. 7A), in the second embodiment, the original cover has a color having sufficiently high luminance and saturation, e.g., of yellow (indicated by a hatched portion in FIG. 7B), and the slice level A is determined in accordance with the lightness of the original cover while the slice level B is determined in accordance with the saturation of the original cover.

Figure 9:
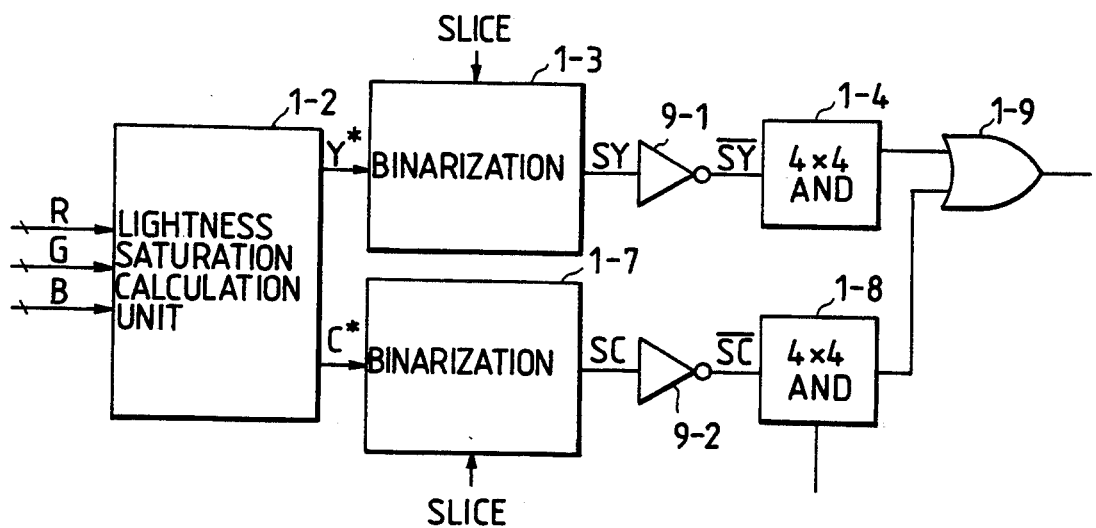
FIG. 9 is a circuit diagram of a second embodiment of the present invention.

FIG. 9 shows the essential parts of the circuit configuration of the second embodiment. A lightness signal L* and a saturation signal C*, output from the lightness/saturation calculation unit 1-2 shown in FIG. 9, are input to judgement units 1-3 and 1-7, respectively. Output signals $S_L$ and $S_C$ of the judgement units represent "the original cover" with respect to the lightness and saturation. Hence, signals $\overline{S_L}$ and $\overline{S_C}$, representing "not the original cover:, i.e., "the original", are generated by logically inverting each of the outputs (8-1, 8-2). As in the case of the first embodiment, presence of the original is detected by implementing the logical AND operations 1-4 and 1-8 of the detection areas and then by implementing the logical OR operation of the "original existing areas" obtained in terms of the lightness and saturation. Other configuration and operation are the same as those of the first embodiment, description thereof being omitted.

The color of the original cover is set to yellow because there are fewer types of colors having high lightness and saturation in comparison to the color close to black having low lightness and saturation and it is considered that only yellow ensures easy determination as to whether the original cover is present. For this reason, in the second embodiment, the range in which detection of the original, including the original of colors having low lightness and saturation, can be performed is increased.

THIRD EMBODIMENT

Where the original cover has a color having high lightness and saturation and the slice level is set in accordance with that level, as in the case of the second embodiment, when a thick book is detected, i.e., when the distance between the original cover base and the original is large, the lightness of the original cover may be reduced, causing erroneous detection.

Hence, in the third embodiment, determination is made using the hue of the original cover in place of the lightness, as well as saturation thereof.

Figure 10:
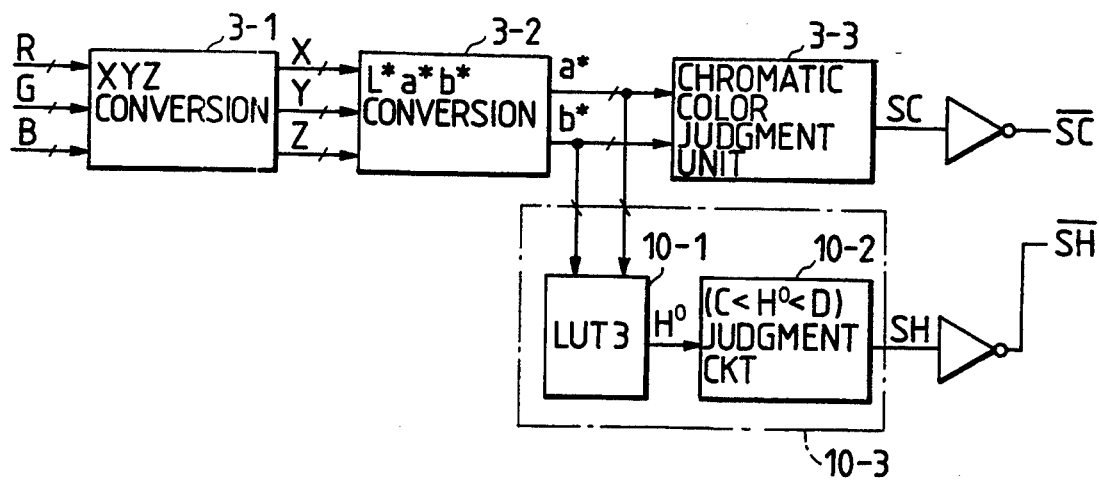
FIG. 10 is a circuit diagram of a third embodiment of the present invention.

FIG. 10 shows the essential parts of the circuit of the third embodiment.

In the third embodiment, saturation $C^{*2}$ and hue angle $H°$ are calculated in place of the lightness and saturation calculated in the first and second embodiments. The hue angle $H°$ is calculated from the hue signals $a^*$ and $b^*$ by equation (4).

$$H° = \tan^{-1}(b^*/a^*) \qquad (4)$$

A look-up table 10-1 inputs $a^*$ and $b^*$ in the image signals output from the $L^*a^*b^*$ conversion circuit, and outputs a hue angle $H°$. A judgement circuit 10-2 of a hue judgement circuit 10-3 judges whether $H°$ is "original cover color" or not using the slice levels C and D set beforehand on the basis of the hue of the original cover.

When $C < H° < D$, $S_H = 1$: the same color as the original cover.
In other cases, $S_H = 0$: not the original cover color As in the case of the second embodiment, since $S_H$ represents "the original cover", i.e., represents "not the original", it is inverted to obtain a signal $\overline{S_H}$ which represents "the original".

Figure 11:
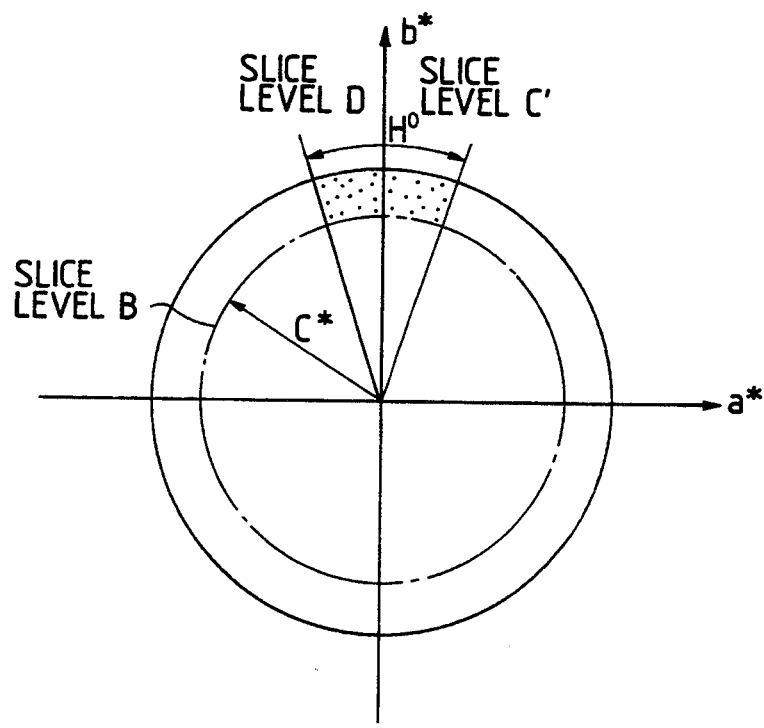
FIG. 11 schematically illustrates the third embodiment as viewed on the a*b* plane.

FIG. 11 is a schematic view of the third embodiment as viewed on the $a^*b^*$ plane. The hatched portion is an area which indicates "original cover color" i.e., which indicates that the original is not present. In the other areas, a signal indicating that the original is present is output. Circuits for implementing the logical AND and OR operations on these signals, as well as the other configuration, are the same as those of the first and second embodiments, description thereof being omitted.

FOURTH EMBODIMENT

Where saturation is used for detecting the original, as in the case of the first to third embodiments, it will be convenient if the slice levels can be set on the basis of the color of the original cover which is selected from a plurality of colors in accordance with the type of color of often used originals.

Hence, in the fourth embodiment, slice levels corresponding to a few types of original covers are registered beforehand. The user can make a selection of an original detection constant value by the designation from the operation unit.

Figure 12:
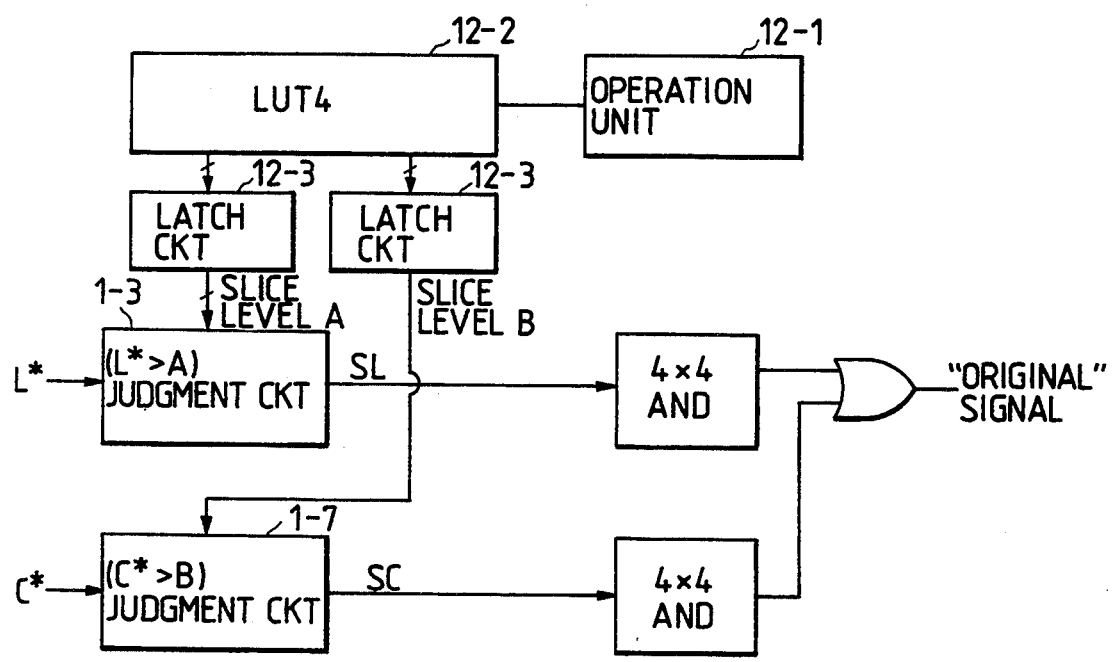
FIG. 12 is a block diagram of a fourth embodiment of the present invention.

FIG. 12 shows an example of the configuration with which the user can designate the color of the original cover. In FIG. 12, an operation unit 12-1 for designating the color of the original cover stores a few types of colors. A look-up table 12-1 outputs in response to the input from the operation unit 12-1 the slice levels A and B determined for each color and used to make a discrimation between original cover and original is terms of the lightness $L^*$ and saturation $C^*$. The slice levels A and B output from the table 12-2 are respectively held by latch circuits 12-3 and then supplied to the binarization circuits 1-3 and 1-7 which are identical to those shown in FIG. 1.

The subsequent signal processing is the same as that performed in each of the aforementioned embodiments, description thereof being omitted.

FIFTH EMBODIMENT

Figure 13:
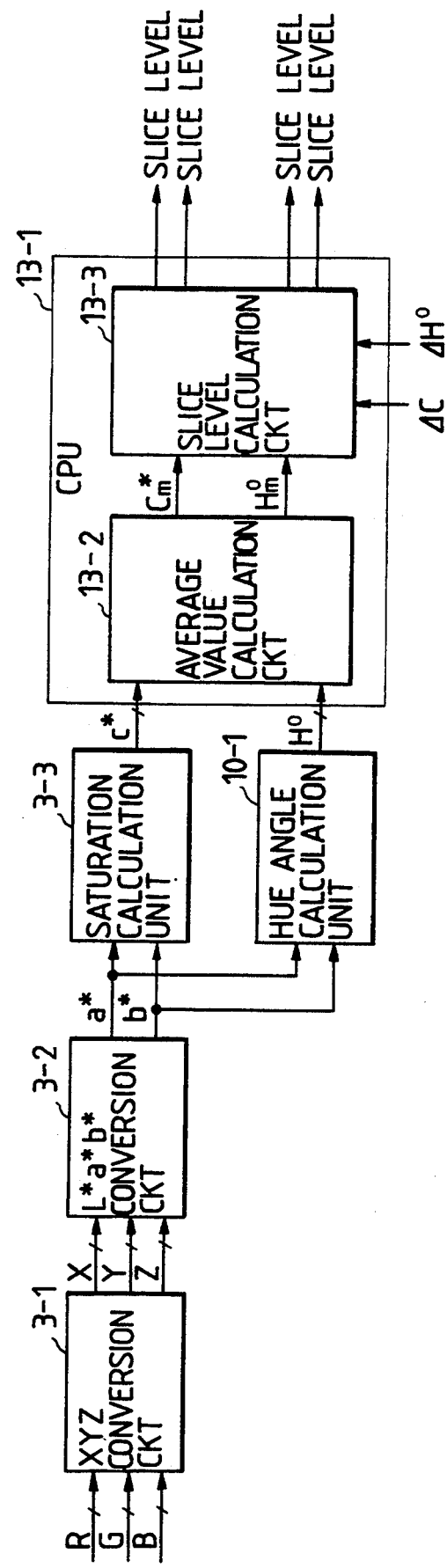
FIG. 13 is a block diagram of a fifth embodiment of the present invention.

In the fourth embodiment, the slice levels of a few types of original cover colors are stored in the look-up table beforehand. In the fifth embodiment, data representing the saturation and lightness/hue of the original cover is obtained in the initial setting process by reading the original cover as an image, and the slice levels for discriminating the original cover from other portions are calculated on the basis of the data and stored in the RAM of the apparatus body. FIG. 13 is a block diagram of an original cover color reading slice level setting circuit in the fifth embodiment.

Coordinates of a plurality of pixels to be read are set in the image reading area, and hue signals $a^*$ and $b^*$ are calculated for each pixel by the XYZ conversion circuit 3-1 and the $L^*a^*b^*$ conversion circuit 3-2. These $a^*$ and $b^*$ are input to the saturation calculation circuit 3-3 and to the hue angle calculation circuit 10-1. Saturation $C^*$ and hue angle $H°$ obtained by the saturation calculation circuit 3-3 and the hue angle calculation circuit 10-1 in the same manner as that of the third embodiment are input to a CPU 13-1.

In the CPU 13-1, an average value calculation circuit 13-2 adds the saturations $C^*$ and hue angles $H°$ of the individual pixels with each other to obtain average values $C_m^*$ and $H_m°$. Next, a slice level calculation circuit 13-3 assumes that the average values $C_m^*$ and $H_m°$ represent "original cover" and determines the slice levels in the following manner using set allowable error widths $\Delta C$ and $\Delta H°$.

Slice level $A = C_m^* + \Delta C$
Slice level $B = C_m^* - \Delta C$
Slice level $C = H_m° + \Delta H°$
Slice level $D = H_m° - \Delta H°$
Using these slice levels, when $A < C^* < B$, $S_C = 1$, while when $C < H° < D$, $S_H = 1$, as in the case of the aforementioned embodiments. Other portions of this embodiment are the same as those of the third embodiment.

In this embodiment, preset allowable error widths ΔC and ΔH° for saturation and hue angle are used for setting the slice levels. However, it may also be arranged such that the user can set adequate values.

As mentioned above, in the aforementioned embodiments, a group of pixels are divided into basic detection areas, and if saturation data of the pixels in each of the basic detection areas is all specified data, it is determined that an original is present regardless of the luminance of the area. Consequently, it is possible to readily make a discrimination of a colored original having a low luminance which would be difficult to detect by the conventional original detection techniques.

Furthermore, the user can register the color of the original cover which is the reference for the detection. Consequently, if the user selects the original cover color having a hue remote from that of the original color which is often used by the user, the original can be detected more easily.

As will be understood from the foregoing description, it is possible according to the present invention to accurately determine the original area of a colored original present on the original base.

In addition to originals made of paper, originals made of negative or positive films or OHP sheets can also be used.

A video camera or a host computer may also be used in place of the image reader.

Furthermore, a chrominance signal includes a hue signal and a saturation signal.

An original area determination may also be performed in accordance with luminance, saturation and hue not luminance and saturation alone.

Furthermore, the original area determination contains determination of the size of the original and determination as to whether the original is present on the platen.

Furthermore, in the case of a copying machine, original area determination performed in a preliminary scanning (prescanning) is desired from the viewpoint of simplification of the circuit configuration.

However, in a case where an image memory for one frame is provided, pre-scanning is not conducted and original area determination may be performed before or after storage of the image signal in the memory.

It is further understood by those skilled in the art that the foregoing description is preferred embodiments of the disclosed apparatus and that various changes and modifications may be made in the invention without departing from the spirit and scope thereof.

Particularly, various combinations of the aforementioned embodiments are intended to be embraced by the claims.

What is claimed is:

1. A color image processing apparatus comprising:
input means for inputting a plurality of color component signals representing a color original;
extracting means for extracting a chromatic signal from the plurality of color component signals;
detecting means for detecting an area where the color original is present in accordance with the chromatic signal extracted by said extracting means; and
memory means for storing a detection result of said detecting means at least until a plurality of color component signals for one color original is input by said input means.

2. A color image processing apparatus according to claim 1, wherein said input means comprises an image reader which employs a CCD line sensor.

3. A color image processing apparatus according to claim 1, wherein said plurality of color component signals are Red, Green and Blue signals.

4. A color image processing apparatus according to claim 1, wherein said chromatic signal is a saturation signal.

5. A color image processing apparatus according to claim 1, wherein said chromatic signal is a hue signal.

6. A color image processing apparatus according to claim 1, wherein said detecting means performs detection for each block consisting of a plurality of pixels.

7. A color image processing apparatus according to claim 1, further comprising processing means for processing said color original in accordance with the results of the detection made by said detecting means.

8. A color image processing apparatus according to claim 7, wherein said processing means has at least a function selected from paper size selection, auto-zooming, center shift and original edge erasing.

9. A color original reading apparatus comprising:
a platen for supporting a color original;
input means for scanning a surface of said platen and for generating a plurality of color components signals;
extracting means for extracting a chromatic signal from the plurality of color component signals;
detecting means for detecting presence or absence of the color original on said platen in accordance with the chromatic signal extracted by said extracting means; and
memory means for storing a detection result of said detecting means at least until scanning of the surface of the platen by said input means is complete.

10. A color original reading apparatus according to claim 9, wherein said input means comprises an image reader which employs a CCD line sensor.

11. A color original reading apparatus according to claim 9, wherein said plurality of color component signals are Red, Green and Blue signals.

12. A color original reading apparatus according to claim 9, wherein said chromatic signal is a saturation signal.

13. A color original reading apparatus according to claim 9, wherein said chromatic signal is a hue signal.

14. A color original reading apparatus according to claim 9, wherein said detecting means performs detection for each block consisting of a plurality of pixels.

15. A color original reading apparatus according to claim 9, further comprising processing means for processing the color original in accordance with the results of the detection made by said detecting means.

16. A color original reading apparatus according to claim 15, wherein said processing means has at least a function selected from paper size selection, auto-zooming, center shift and original edge erasing.

17. A color original reading apparatus comprising:
a platen for supporting a color original;
input means for scanning a surface of the platen and for generating a plurality of color component signals;
extracting means for extracting a chromatic signal from the plurality of color component signals; and detecting means for detecting a size of the color original on the surface of the platen in accordance with the chromatic signal extracted by said extracting means.

18. A color original reading apparatus according to claim 17, wherein said input means comprises an image reader which employs a CCD line sensor.

19. A color original reading apparatus according to claim 17, wherein said plurality of color component signals are Red, Green and Blue signals.

20. A color original reading apparatus according to claim 17, wherein said chromatic signal is a saturation signal.

21. A color original reading apparatus according to claim 17, wherein said chromatic signal is a hue signal.

22. A color original reading apparatus according to claim 17, wherein said detecting means performs detection for each block consisting of a plurality of pixels.

23. A color original reading apparatus according to claim 17, further comprising memory means for storing the results of the detection by said detecting means.

24. A color original reading apparatus according to claim 23, wherein said memory means stores the detection result at least until scanning of the surface of the platen by said input means is complete.

25. A color original reading apparatus according to claim 17, further comprising processing means for processing the color original in accordance with the results of the detection made by said detecting means.

26. A color original reading apparatus according to claim 25, wherein said processing means has at least a function selected from paper size selection, auto-zooming, center shift and original edge erasing.

27. A color image processing apparatus comprising:
input means for inputting a plurality of color component signals representing a color original;
extracting means for extracting a plurality of signals, one of which is a chromatic signal or a monochromatic signal, from the plurality of color component signals;
detecting means for detecting an area where the color original is present in accordance with the plurality of signals extracted by said extracting means; and
memory means for storing a detection result of said detecting means at least until a plurality of color component signals for one color original is input by said input means.

28. A color image processing apparatus according to claim 27, wherein said input means comprises an image reader which employs a CCD line sensor.

29. A color image processing apparatus according to claim 27, wherein said plurality of color component signals are Red, Green and Blue signals.

30. A color image processing apparatus according to claim 27, wherein said chromatic signal is a saturation signal.

31. A color image processing apparatus according to claim 27, wherein said chromatic signal is a hue signal.

32. A color image processing apparatus according to claim 27, wherein said detecting means performs detection for each block consisting of a plurality of pixels.

33. A color image processing apparatus according to claim 27, further comprising processing means for processing the color original in accordance with the results of the detection made by said detecting means.

34. A color image processing apparatus according to claim 33, wherein said processing means has at least a function selected from paper size selection, auto-zooming, center shift and original edge erasing.

35. A color image processing apparatus according to claim 27, wherein the plurality of signals extracted by said extracting means includes a lightness signal.

* * * * *

UNITED STATES PATENT AND TRADEMARK OFFICE
CERTIFICATE OF CORRECTION

PATENT NO.  :  5,353,130
DATED       :  October 4, 1994
INVENTOR(S) :  Akiko Hasegawa It is certified that error appears in the above-identified patent and that said Letters Patent is hereby corrected as shown below:

On the cover page, under the "US PATENT DOCUMENTS" heading, insert the following:

```
--4,439,790   3/1984   Yoshida ....... 358/256
  4,686,577   8/1987   Arimoto ....... 358/256
  4,811,047   3/1989   Hosaka et al... 355/14
  5,001,574   3/1991   Shimizu et al.. 358/448--
```

Signed and Sealed this

Thirtieth Day of May, 1995

*Attest:*

BRUCE LEHMAN

*Attesting Officer*     *Commissioner of Patents and Trademarks*